(12) United States Patent
Zhang et al.

(10) Patent No.: US 10,338,444 B2
(45) Date of Patent: Jul. 2, 2019

(54) ARRAY SUBSTRATE WITH CONDUCTIVE BLACK MATRIX, MANUFACTURING METHOD THEREOF AND DISPLAY DEVICE

(71) Applicant: BOE TECHNOLOGY GROUP CO., LTD., Beijing (CN)

(72) Inventors: Feng Zhang, Beijing (CN); Zhanfeng Cao, Beijing (CN); Qi Yao, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 15/314,695

(22) PCT Filed: Apr. 7, 2016

(86) PCT No.: PCT/CN2016/078729
§ 371 (c)(1),
(2) Date: Nov. 29, 2016

(87) PCT Pub. No.: WO2016/202060
PCT Pub. Date: Dec. 22, 2016

(65) Prior Publication Data
US 2017/0184931 A1    Jun. 29, 2017

(30) Foreign Application Priority Data

Jun. 19, 2015    (CN) .......................... 2015 1 0347724

(51) Int. Cl.
*G02F 1/1362*    (2006.01)
*G02F 1/1339*    (2006.01)
(Continued)

(52) U.S. Cl.
CPC .... *G02F 1/136209* (2013.01); *G02F 1/13394* (2013.01); *G02F 1/133308* (2013.01);
(Continued)

(58) Field of Classification Search
CPC ....................... G02F 1/136209; G02F 1/13394
See application file for complete search history.

(56) References Cited

U.S. PATENT DOCUMENTS

| 5,414,547 A | 5/1995 | Matsuo et al. |
| 5,510,916 A | 4/1996 | Takahashi |

(Continued)

FOREIGN PATENT DOCUMENTS

| CN | 1191990 A | 9/1998 |
| CN | 1369731 A | 9/2002 |

(Continued)

OTHER PUBLICATIONS

First Chinese Office Action dated May 4, 2017.
(Continued)

*Primary Examiner* — Victoria K. Hall
(74) *Attorney, Agent, or Firm* — Dilworth & Barrese, LLP.; Michael J. Musella, Esq.

(57) ABSTRACT

An array substrate and a manufacturing method thereof and a display device are disclosed. The array substrate includes a base substrate, and a color filter layer, a common electrode and a black matrix disposed on the base substrate, the black matrix is capable of conducting electricity, and the black matrix is electrically connected with the common electrode. The array substrate can reduce parasitic capacitance, and decrease power consumption.

15 Claims, 6 Drawing Sheets

(51) Int. Cl.
 *G02F 1/1343* (2006.01)
 *G02F 1/1333* (2006.01)
 *G02F 1/136* (2006.01)

(52) U.S. Cl.
 CPC .. *G02F 1/133345* (2013.01); *G02F 1/134309* (2013.01); *G02F 1/136286* (2013.01); *G02F 2001/13398* (2013.01); *G02F 2001/13606* (2013.01); *G02F 2001/133354* (2013.01); *G02F 2001/134372* (2013.01); *G02F 2001/134381* (2013.01); *G02F 2001/136222* (2013.01); *G02F 2201/121* (2013.01); *G02F 2201/123* (2013.01); *G02F 2201/40* (2013.01); *G02F 2202/16* (2013.01)

(56) References Cited

U.S. PATENT DOCUMENTS

| | | | |
|---|---|---|---|
| 5,850,271 | A | 12/1998 | Kim et al. |
| 6,069,678 | A | 5/2000 | Sakamoto et al. |
| 6,175,395 | B1 | 1/2001 | Yamazaki et al. |
| 6,271,903 | B1 | 8/2001 | Shin et al. |
| 6,466,281 | B1 | 10/2002 | Huang et al. |
| 6,522,315 | B2 | 2/2003 | Ozawa et al. |
| 8,692,258 | B2 * | 4/2014 | Kim .................. H01L 27/1259 257/72 |
| 9,366,923 | B2 * | 6/2016 | Shen ................ G02F 1/136209 |
| 9,589,834 | B2 * | 3/2017 | Niu .................. H01L 21/76834 |
| 9,910,327 | B2 * | 3/2018 | Zhang ............... G02F 1/134309 |
| 2002/0101557 | A1 * | 8/2002 | Ono .................. G02F 1/134363 349/143 |
| 2002/0140891 | A1 | 10/2002 | Tomioka et al. |
| 2003/0043318 | A1 * | 3/2003 | Kim .................. G02F 1/133514 349/106 |
| 2003/0184699 | A1 | 10/2003 | Matsumoto et al. |
| 2004/0263754 | A1 | 12/2004 | Ahn et al. |
| 2004/0266082 | A1 | 12/2004 | You |
| 2005/0041182 | A1 | 2/2005 | Ono et al. |
| 2005/0110716 | A1 * | 5/2005 | Eida .................. H01L 27/322 345/76 |
| 2006/0146212 | A1 | 7/2006 | Ahn et al. |
| 2006/0232529 | A1 | 10/2006 | Midorikawa |
| 2007/0064179 | A1 | 3/2007 | Park et al. |
| 2007/0126953 | A1 | 6/2007 | Lai et al. |
| 2007/0177090 | A1 | 8/2007 | Shimomaki |
| 2007/0252142 | A1 | 11/2007 | Yoon |
| 2007/0273819 | A1 | 11/2007 | Kawasaki et al. |
| 2008/0001883 | A1 | 1/2008 | Kim et al. |
| 2008/0002126 | A1 | 1/2008 | Lim et al. |
| 2008/0003380 | A1 * | 1/2008 | Kim ................. G02B 5/201 428/1.1 |
| 2008/0186440 | A1 | 8/2008 | Lim et al. |
| 2008/0266497 | A1 | 10/2008 | Chen |
| 2008/0309864 | A1 | 12/2008 | Lee et al. |
| 2009/0046227 | A1 * | 2/2009 | Fan Jiang ......... G02F 1/133555 349/114 |
| 2009/0208667 | A1 * | 8/2009 | Harada .................. C23C 4/02 427/551 |
| 2009/0323005 | A1 | 12/2009 | Ota |
| 2010/0003776 | A1 | 1/2010 | Park |
| 2010/0040960 | A1 | 2/2010 | Piao et al. |
| 2010/0320464 | A1 | 12/2010 | Chang et al. |
| 2011/0157507 | A1 * | 6/2011 | Koh .................... G02F 1/13439 349/43 |
| 2013/0235290 | A1 * | 9/2013 | Takezoe ................ C09K 19/02 349/33 |
| 2013/0270562 | A1 * | 10/2013 | Yamazaki ............. H01L 29/786 257/57 |
| 2013/0323470 | A1 * | 12/2013 | Chen .................... H01B 5/14 428/157 |
| 2014/0055690 | A1 * | 2/2014 | Song .................. G02F 1/13338 349/12 |
| 2014/0146166 | A1 * | 5/2014 | Shin .................. G01B 11/272 348/95 |
| 2014/0232970 | A1 * | 8/2014 | Huh .................. G02F 1/133512 349/106 |
| 2014/0291672 | A1 * | 10/2014 | Yamazaki ........... H01L 27/1225 257/43 |
| 2014/0340593 | A1 * | 11/2014 | Sato .................... G02F 1/13338 349/12 |
| 2014/0353614 | A1 * | 12/2014 | Park .................... H01L 27/3225 257/40 |
| 2015/0187800 | A1 | 7/2015 | Park et al. |
| 2015/0221681 | A1 | 8/2015 | Guo et al. |
| 2016/0017168 | A1 * | 1/2016 | Korchev .................. C09D 5/00 427/553 |
| 2016/0195751 | A1 * | 7/2016 | Niu .................. H01L 21/76834 257/401 |
| 2016/0299395 | A1 * | 10/2016 | Kosuge ............. G02F 1/136209 |
| 2017/0248827 | A1 * | 8/2017 | Zhang ............... G02F 1/134309 |
| 2018/0039120 | A1 * | 2/2018 | Saitoh .................. G02F 1/1368 |

FOREIGN PATENT DOCUMENTS

| | | | |
|---|---|---|---|
| CN | 1373390 | A | 10/2002 |
| CN | 101078824 | A | 11/2007 |
| CN | 101097925 | A | 1/2008 |
| CN | 101295090 | A | 10/2008 |
| CN | 100517033 | C | 7/2009 |
| CN | 102156368 | A | 8/2011 |
| CN | 103226272 | A | 7/2013 |
| CN | 103353699 | A | 10/2013 |
| CN | 203299499 | U | 11/2013 |
| CN | 104317097 | A | 1/2015 |
| CN | 204129400 | U | 1/2015 |
| CN | 104730603 | A | 6/2015 |
| CN | 104730603 | A | 6/2015 |
| CN | 104880879 | A | 9/2015 |
| CN | 105093654 | A | 11/2015 |
| JP | H10186407 | A | 7/1998 |
| JP | H11337976 | A | 10/1999 |
| JP | 2002258262 | A | 9/2002 |
| JP | 2002296615 | A | 10/2002 |
| JP | 2003207808 | A | 7/2003 |
| JP | 2003295207 | A | 10/2003 |
| JP | 2006189779 | A | 7/2006 |
| JP | 2006281189 | A | 10/2006 |
| JP | 2007-247043 | | * 9/2007 ............... C23C 4/18 |
| JP | 2007233317 | A | 9/2007 |
| JP | 2007240544 | A | 9/2007 |
| JP | 2008191669 | A | 8/2008 |
| JP | 2010008758 | A | 1/2010 |
| KR | 20040062015 | A | 7/2004 |

OTHER PUBLICATIONS

Search Report and Written Opinion dated Jul. 1, 2016 from State Intellectual Property Office of the P.R. China.
First Chinese Office Action dated Nov. 27, 2014.
Second Chinese Office Action dated Feb. 15, 2015, Note: Feb. 28, 2015.
International Preliminary Report on Patentability issued in the PCT international application PCT/CN2013/088658 dated Dec. 29, 2015.
International Search Report (ISR) of the international application PCT/CN2013/088658.
Requirement for restriction issued in U.S. Appl. No. 14/357,725, The Office Action dated Jun. 2, 2016.
Office Action issued on U.S. Appl. No. 13/239,744, dated Dec. 4, 2012.
Office Action issued on U.S. Appl. No. 13/239,744, dated Jun. 7, 2013.
First Chinese Office Action issued in CN201410081554.9 dated Jan. 27, 2016.
First Chinese Office Action issued in CN20110020242.3 dated Mar. 27, 2012.
Fourth Chinese Office Action issued in CN20110020242.3 dated Jan. 29, 2014.
Japanese Office Action issued in JP 2011-250536 dated Jun. 15, 2015.

(56) References Cited

OTHER PUBLICATIONS

Korean Office Action issued in KR 10-2011-119470 dated Dec. 9, 2013.
Korean Office Action issued in KR 10-2011-119470 dated Feb. 1, 2013.
Korean Office Action issued in KR 10-2011-119470 dated Aug. 19, 2013.
Office Action issued in U.S. Appl. No. 14/498,045 dated Dec. 31, 2015.

* cited by examiner

# ARRAY SUBSTRATE WITH CONDUCTIVE BLACK MATRIX, MANUFACTURING METHOD THEREOF AND DISPLAY DEVICE

TECHNICAL FIELD

Embodiments of the present disclosure relate to an array substrate, a manufacturing method thereof and a display device, particularly relate to a color filter on array (COA) array substrate, a manufacturing method thereof and a display device.

BACKGROUND

COA technique is a technique forming a color filter layer and a black matrix on an array substrate. With the COA technique, a deviation generated during assembling a color filer substrate with a color filter and a black matrix formed thereon and an array substrate can be effectively avoided, an aperture ratio of a display device is increased, and light leakage is decreased.

SUMMARY

At least one embodiment of the disclosure provides an array substrate and a manufacturing method thereof and a display device to reduce a parasitic capacitance and power consumption of an array substrate.

At least one embodiment of the disclosure provides an array substrate including a base substrate, and a color filter layer, a common electrode and a black matrix disposed on the base substrate, wherein the black matrix is capable of conducting electricity, and the black matrix is electrically connected with the common electrode.

For example, according to the array substrate provided by an embodiment of the disclosure, the black matrix is located on or below the common electrode, and the black matrix is in contact with the common electrode so as to be electrically connected with the common electrode.

For example, according to the array substrate provided by an embodiment of the disclosure, the black matrix includes a conductive sub-layer, and the conductive sub-layer is provided with a pattern of the black matrix.

For example, according to the array substrate provided by an embodiment of the disclosure, the conductive sub-layer is in contact with the common electrode.

For example, according to the array substrate provided by an embodiment of the disclosure, a material of the conductive sub-layer includes metal or metal alloy.

For example, according to the array substrate provided by an embodiment of the disclosure, the material of the conductive sub-layer includes aluminium, molybdenum, copper, silver, aluminium-neodymium alloy or molybdenum-titanium alloy.

For example, according to the array substrate provided by an embodiment of the disclosure, the black matrix further includes a light absorbing sub-layer stacked on the conductive sub-layer, the light absorbing layer is provided with the pattern of the black matrix.

For example, according to the array substrate provided by an embodiment of the disclosure, a material of the light absorbing sub-layer includes metal oxide, metal nitride, metal alloy oxide or metal alloy nitride.

For example, according to the array substrate provided by an embodiment of the disclosure, a material of the light absorbing sub-layer includes aluminium oxide, chromium oxide, copper oxide, molybdenum oxide, aluminium nitride, chromium nitride, copper nitride, molybdenum nitride, molybdenum-tantalum alloy oxide, molybdenum-titanium alloy oxide, molybdenum-tantalum alloy nitride, or molybdenum-titanium alloy nitride.

For example, according to the array substrate provided by an embodiment of the disclosure, the array substrate further includes a signal line disposed on the base substrate, and a projection of the common electrode on the base substrate covers a projection of the signal line on the substrate.

For example, according to the array substrate provided by an embodiment of the disclosure, the signal line includes at least one of a data line or a gate line.

For example, according to the array substrate provided by an embodiment of the disclosure, the array substrate further includes a pixel electrode located on or below the common electrode, and an insulation dielectric layer located between the common electrode and the pixel electrode.

At least one embodiment of the disclosure provides a manufacturing method of an array substrate, including: forming a color filter layer, a common electrode, and a black matrix on the base substrate, wherein the black matrix is capable of conducting electricity, and the black matrix is electrically connected with the common electrode.

For example, according to the manufacturing method of the array substrate provided by an embodiment of the disclosure, the manufacturing method of the array substrate further includes forming a signal line, wherein a projection of the common electrode on the base substrate covers a projection of the signal line on the substrate.

For example, according to the manufacturing method of the array substrate provided by an embodiment of the disclosure, the signal line includes at least one of a data line or a gate line.

For example, according to the manufacturing method of the array substrate provided by an embodiment of the disclosure, the black matrix is formed before or after the common electrode is formed, and the black matrix is in contact with the common electrode so as to be electrically connected with the common electrode.

At least one embodiment of the disclosure provides a display device including the array substrate according to any one of the array substrate provided by embodiments of the disclosure.

For example, according to the display device provided by an embodiment of the disclosure, the display device further includes an opposing substrate opposite to the array substrate, and the opposing substrate includes a transparent substrate, and a spacer, an alignment mark and a light shielding frame located on a surface of the transparent substrate facing to the array substrate; and a display area of the display device is surrounded by the light shielding frame; a material of the spacer, the alignment mark and the light shielding frame is the same black organic insulation material.

For example, according to the display device provided by an embodiment of the disclosure, the black organic insulation material includes red resin, green resin and blue resin; or the black organic insulation material includes a black resin with light absorbing property; or the black organic insulation material includes a resin and carbon particles, and the carbon black particles are enclosed by the resin.

For example, according to the display device provided by an embodiment of the disclosure, a dielectric coefficient of the black organic insulation material is less than 5, a sheet resistance is greater than $1.0 \times 10^{14} \Omega/\square$, a voltage maintenance ratio is greater than 85%, an optical density value is in a range of 1.0-2.0/μm.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

Figure 1:
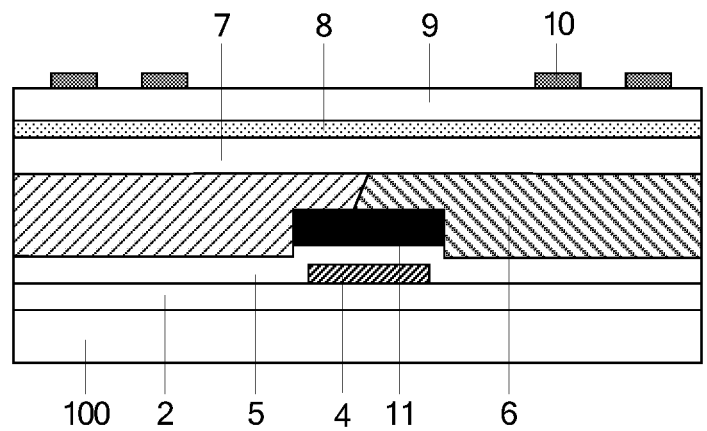
FIG. 1 is a sectional view of a COA array substrate.

REFERENCE NUMERALS 100-base substrate; 2-gate insulation layer; 4-data line; 5-passivation layer; 6-color filter layer; 7-planarization layer; 8-common electrode; 9-insulation dielectric layer; 10-pixel electrode; 11-black matrix; 111-conductive sub-layer; 112-light absorbing sub-layer; 200-transparent substrate; 21-spacer; 22-light shielding frame; 23-alignment mark; AA-display area; 1'-gate line, 4'-source electrode. 4"-drain electrode.

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

FIG. 1 illustrates a sectional view of a COA array substrate, the COA array substrate includes: a base substrate 100, and a gate insulation layer 2, a data line 4, a passivation layer 5, a black matrix 11, a color filter layer 6, a planarization layer 7, a common electrode 8, an insulation dielectric layer 9, and a pixel electrode 10 sequentially disposed on the base substrate 100.

However, in the actual application of the above-mentioned array substrate, inventors of the application note that: a parasitic capacitance of the COA array substrate is large. Therefore, power consumption of the COA array substrate increases.

A parasitic capacitance of an ordinary COA array substrate is large. According to a great deal of experiments and studies, inventors realize that the reason for this problem lies in the following.

As illustrated in FIG. 1, in a COA array substrate of conventional technology, potential of a data line 4 is different from a potential of a common electrode 8. A parasitic capacitor is generated between the data line 4 and the common electrode 8. The black matrix 11 is located between the data line 4 and the common electrode 8. In one aspect, parasitic capacitors can be generated between the black matrix 11 and the data line 4, and between the black matrix 11 and the common electrode 8, therefore, the parasitic capacitance can be increased between the data line 4 and the common electrode 8. In the other aspect, the black matrix 11 becomes a portion of the dielectric of the parasitic capacitors between the data line 4 and the common electrode 8. Usually, the black matrix 11 is formed by an organic resin including a plurality of carbon black particles, because the carbon black particles are conductive and equipotential, when an electric field passing through the carbon black particles in conducting process, a direction of the electric field lines between the data line 4 and the common electrode does not change, and a strength of the electric field does not change. That is to say, the electric field lines continue to spread bypassing the carbon black particles. Because the carbon black particles are provided with a certain volume, accordingly, a thickness of the dielectric between the data line 4 and the common electrode 8 is decreased. And because a formula of $$C = \frac{\varepsilon S}{d},$$

(wherein C is a capacitance value, ε is a dielectric constant of a dielectric between two electrode plates of a capacitor, S is an opposite area between two electrode plates of the capacitor, d is a thickness of the dielectric between two electrode plates of the capacitor), the parasitic capacitance between the data line 4 and the common electrode 8 is increased because of carbon black particles of the black matrix 11. Therefore, the parasitic capacitance of a COA array substrate is large, an unnecessary power of the COA array substrate caused by the large parasitic capacitance is increased, and the power consumption of the COA array substrate is increased.

The above paragraphs are illustrated by taking large parasitic capacitance formed between a data line and a common electrode as an example. It should be noted that, the problem that the parasitic capacitance is large is also generated between a gate line and the common electrode in an array substrate.

First Embodiment

The embodiment provides a COA array substrate, the COA array substrate includes a base substrate, and a color filter layer, a common electrode and a black matrix disposed on the base substrate. The black matrix is capable of conducting electricity, and the black matrix is electrically connected with the common electrode. For example, the black matrix is made of a conductive material.

In the COA array substrate provided by the embodiment, because the black matrix is electrically connected with the common electrode, a potential of the black matrix is equal to a potential of the common electrode, a parasitic capacitance increased by the black matrix can be decreased. For example, no parasitic capacitor is provided between the black matrix and the common electrode, therefore, the parasitic capacitance between a signal line and the common electrode can be decreased.

Second Embodiment

Figure 2:
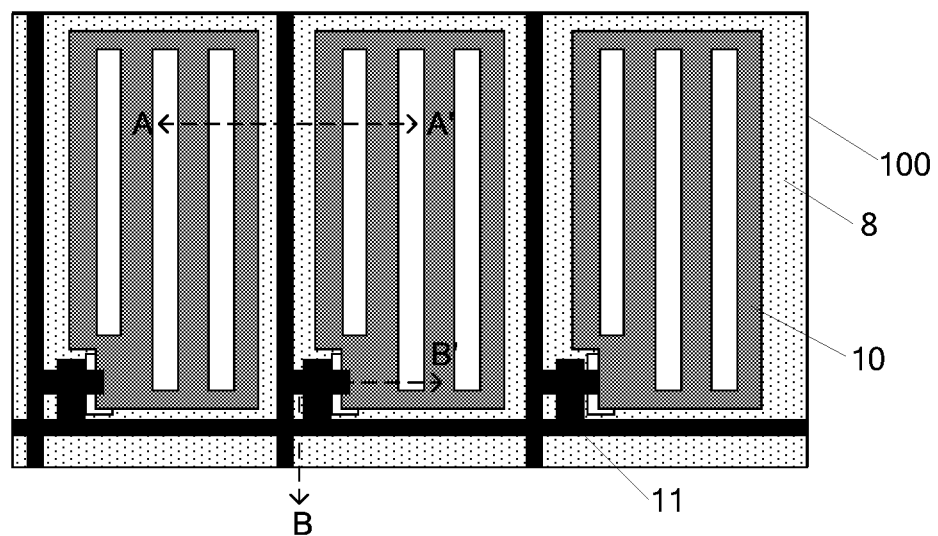
FIG. 2 is a plan view of a COA array substrate provided by a second embodiment of the disclosure.
Figure 3:
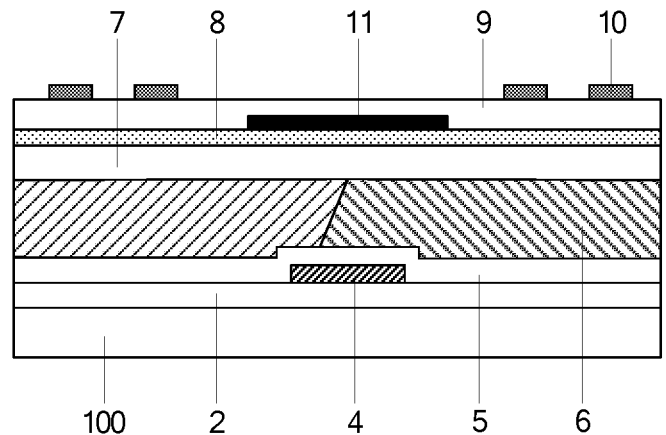
FIG. 3 is a sectional view along A-A' line of the COA array substrate of FIG. 2.
Figure 4:
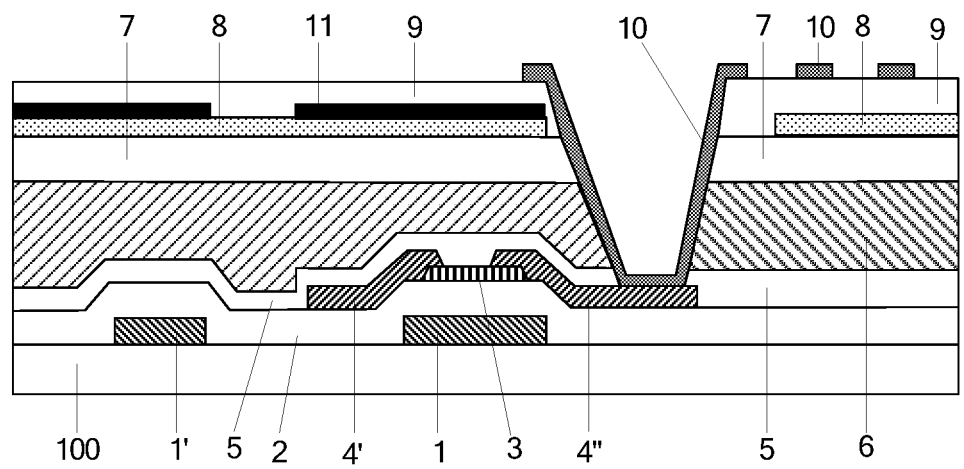
FIG. 4 is a sectional view along B-B' line of the COA array substrate of FIG. 2.

Based on the first embodiment, a COA array substrate with detailed structure is provided by the embodiment. As illustrated in FIGS. 2-4, the COA array substrate includes a base substrate 100, and a gate electrode layer, a gate insulation layer 2, an active layer 3, a source/drain electrode layer, a passivation layer 5, a color filter layer 6, a planarization layer 7 and a common electrode 8 are sequentially disposed on the base substrate 100. The gate electrode layer includes a gate electrode 1 and a gate line 1'. The source/drain electrode layer includes a source electrode 4', a drain electrode 4" and a data line 4. For example, the color filter layer 6 at least includes color filters of three colors such as red, green and blue. For example, the passivation layer 5 is disposed between a signal line and the color filter layer 6, and the signal line includes at least one of a data line and a gate line. For example, the planarization layer 7 is disposed between the common electrode 8 and the color filter layer 6.

The above-mentioned COA array substrate further includes a black matrix 11. The black matrix 11 is located on or below the common electrode 8 (FIG. 3 and FIG. 4 only illustrate a case that the black matrix 11 is located on the common electrode 8), and the black matrix 11 is in contact with the common electrode 8 so as to be electrically connected with the common electrode 8. In the embodiment, by changing a location of the black matrix 11, the black matrix 11 is in contact with the common electrode 8 directly, so as to be electrically connected with the common electrode 8. In a first aspect, the black matrix 11 and the common electrode 8 have the same potential, no parasitic capacitor is provided between the black matrix 11 and the common electrode 8. In a second aspect, a parasitic capacitance between the black matrix and the signal line is decreased because a distance between the black matrix and the signal line is increased. In a third aspect, the black matrix 11 acts as a portion of an electrode plate of the parasitic capacitor of the signal line and the common electrode 8, and the black matrix 11 has no influence on electric field lines between the signal line and the common electrode 8, therefore, a thickness of a dielectric layer between the signal line and the common electrode 8 is not decreased, and the thickness of the dielectric layer of the parasitic capacitor is not decreased because it is not affected by the black matrix 11. That is, the thickness of the dielectric layer of the parasitic capacitor between the signal line and the common electrode 8 in the embodiment is larger than that of a dielectric layer of a parasitic capacitor between a signal line and a common electrode a conventional technology. That is, the parasitic capacitance between the signal line and the common electrode 8 of the COA array substrate provided by the embodiment is less than that between a signal line and a common electrode of a COA array substrate in the conventional technology, accordingly, an unnecessary waste of power consumption in the embodiment is also less than that of power consumption in the conventional technology, and power consumption of the COA array substrate in the embodiment is lower than that of the COA array substrate in the conventional technology. The signal line includes at least one of a data line 4 or a gate line 1'. Usually, in an array substrate, the data line is electrically connected with the source electrode 4' to input an electrical signal, the gate line 1' is electrically connected with the gate electrode 1 of a thin film transistor to input an electrical signal. The thin film transistor acts as a switching to control on and off of a sub-pixel. The thin film transistor includes a gate electrode 1, a gate insulation layer 2, an active layer 3, a source electrode 4' and a drain electrode 4".

Moreover, a sectional area of current transport is increased because the black matrix 11 is electrically connected with the common electrode, and this is equivalent to connecting a resistor to the common electrode 8 in parallel, and a whole resistance of the common electrode 8 and the black matrix 11 is decreased. It is beneficial to reduce a transporting delay and loss of a signal on the common electrode 8, and improve uniformity of electrical current on the common electrode 8.

For example, in an example of the embodiment, the black matrix 11 at least includes a conductive sub-layer, and the conductive sub-layer is provided with a pattern of the black matrix 11. The conductive sub-layer is in contact with the common electrode 8 to be electrically connected with the common electrode 8. That is, the electrical connection between the black matrix 11 and the common electrode 8 is realized by the conductive sub-layer.

A material of the conductive sub-layer can be conductive materials such as metal or metal alloy to improve conductive property of the conductive sub-layer. For example, the material of the conductive sub-layer includes aluminium, molybdenum, copper, silver, aluminium-neodymium alloy or molybdenum-titanium alloy. The conductive sub-layer can be made of a conductive material, and can be a stacking layer made of a plurality of conductive materials, and limitations are not imposed thereto.

Figure 5A:
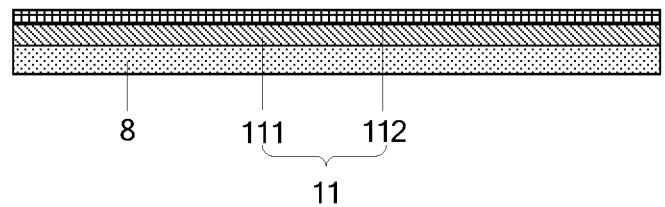
FIG. 5 (a) and 5(b) are cross sectional views of a black matrix of the COA array substrate provided by the second embodiment of the disclosure.

As illustrated in FIG. 5(a), in order to enhance absorbing property of the black matrix 11 to make the black matrix 11 present black, reduce reflection to environment light of the black matrix, improve display contrast ratio, and improve picture quality, in addition to the conductive sub-layer 111 being in contact with the common electrode 8 included by the black matrix 11, the black matrix further includes a light absorbing sub-layer 112 stacking on the conductive sub-layer 111, and the light absorbing layer 112 is provided with the pattern of the black matrix 11. The light absorbing layer 112 is provided with a good light absorbing property, and capable of reducing reflection of the light absorbing layer 112. For example, the light absorbing layer 112 is away from a base substrate of a COA array substrate with respect to the conductive sub-layer, and the light absorbing layer is closer to a light exiting side. For example, the light absorbing layer is capable of conducting electricity, and has an electricity conducting property. Usually, the electricity conducting property of the light absorbing layer is less than that of the conductive sub-layer. Of course, the common electrode 8 can be in contact with the light absorbing layer 112 and disposed on the light absorbing layer 112, and the light absorbing layer 112 is in contact with the conductive sub-layer 111 and disposed on the conductive sub-layer 111, and limitations are not imposed thereto.

A material of the light absorbing sub-layer 112 includes a material with good light absorbing property and low reflection rate such as metal oxide, metal nitride, metal alloy oxide or metal alloy nitride, for example, a material of the light absorbing sub-layer 112 includes aluminium oxide, chromium oxide, copper oxide, molybdenum oxide, aluminium nitride, chromium nitride, copper nitride, molybdenum nitride, molybdenum-tantalum alloy oxide, molybdenum-titanium alloy oxide, molybdenum-tantalum alloy nitride, or molybdenum-titanium alloy nitride. For further example, the light absorbing layer can include at least one selected from the group consisting of $AlO_x$, $CrO_x$, $CuO_x$, $MoO_x$, $MoTaO_x$, $MoTiO_x$, $AlN_x$, $CrN_x$, $CuN_x$, $MoN_x$, $MoTaN_x$, MoTiNx. The light absorbing sub-layer 112 can be made of a material with good light absorbing property and low reflection rate, can also be made of stacking layers which are made of a plurality of materials with good light absorbing property and low reflection rate.

As illustrated in FIG. 3 and FIG. 4, the COA array substrate provided by an example of the embodiment further includes a pixel electrode 10 located on the common electrode 8, the pixel electrode 10 is electrically connected with the drain electrode 4" through a via hole. For example, the pixel electrode 10 can be a slit electrode, and the common electrode 8 can be a plate-shaped electrode. Therefore, an electric filed is formed between the pixel electrode 10 and the common electrode 8 to rotate liquid crystals. The insulation dielectric layer 9 between the common electrode 8 and the pixel electrode 10 is configured to insulate the common electrode 8 and the pixel electrode 10. The COA array substrate is an array substrate of advanced-super dimensional switching mode.

Third Embodiment

Figure 6:
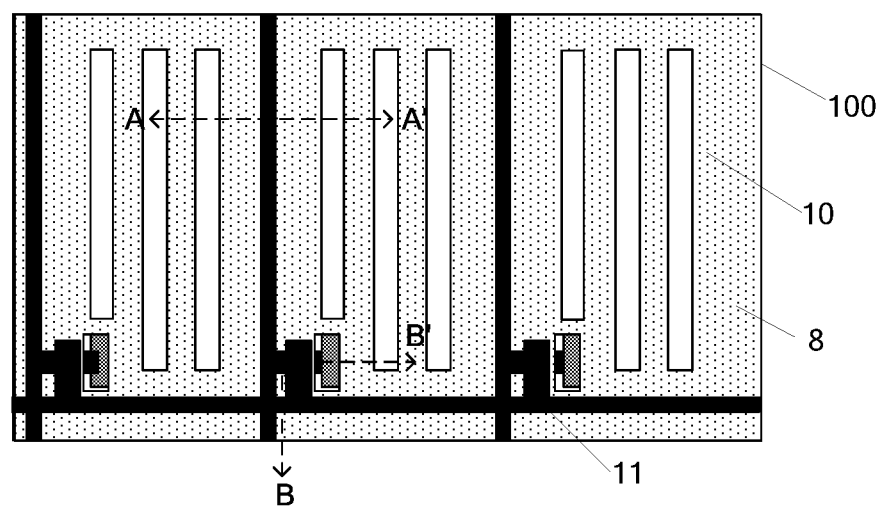
FIG. 6 is a plan view of a COA array substrate provided by a third embodiment of the disclosure.
Figure 7:
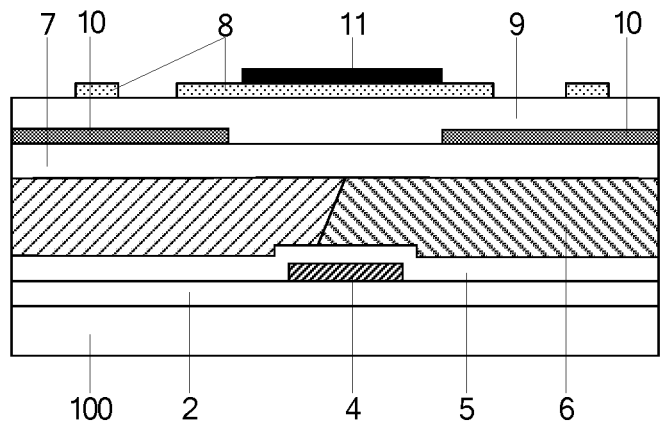
FIG. 7 is a sectional view along A-A' line of the COA array substrate of FIG. 5.
Figure 8:
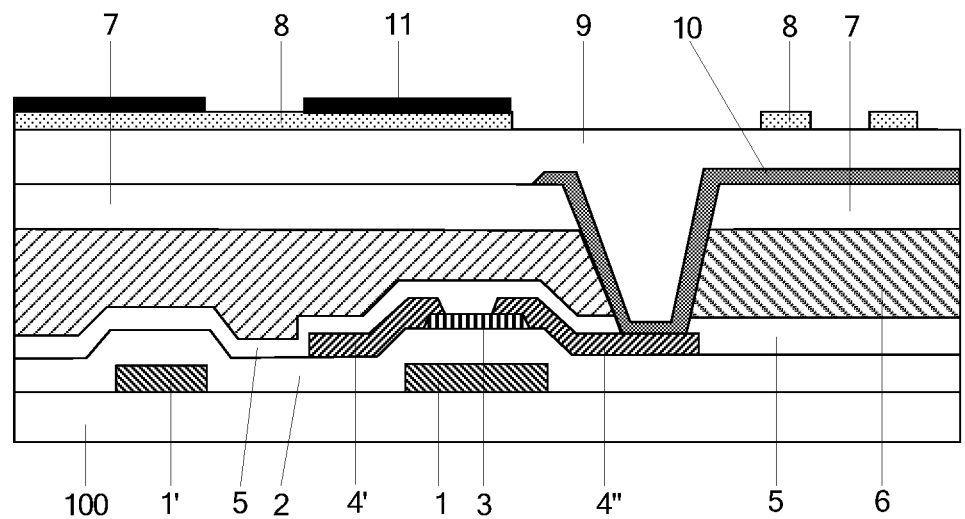
FIG. 8 is a sectional view along B-B' line of the COA array substrate of FIG. 5.

As illustrated in FIGS. 6-8, in a COA array substrate provided by the embodiment, the black matrix 11 is also located on or below the common electrode 8, and electrically connected with the common electrode 8 to decrease a parasitic capacitance between the common electrode 8 and at least one of the data line 4 and the gate line 1" and reduce the power consumption of the COA array substrate. Different from the second embodiment, the present embodiment provides that the common electrode 8 is located on the pixel electrode 10. For example, the common electrode 8 can be a slit electrode, and the pixel electrode can be a plate-shaped electrode, an electric field is formed between the common electrode and the pixel electrode to rotate liquid crystals. The COA array substrate is an array substrate of high aperture advanced-super dimensional switching mode.

Fourth Embodiment

A manufacturing method of the COA array substrate provided by the embodiment, as illustrated in FIG. 3 and FIG. 7, includes forming a color filter layer 6, a common electrode 8, and a black matrix 11 on the base substrate 100, and the black matrix is capable of conducting electricity, and the black matrix 11 is electrically connected with the common electrode 8. As illustrated in FIGS. 3 and 7, the array substrate is further formed with a passivation layer and a planarization layer.

In the COA array substrate manufactured by the method provided by the embodiment, the black matrix 11 is electrically connected with the common electrode 8, the parasitic capacitance between the black matrix and the common electrode 8 is zero. Therefore, the parasitic capacitance between the signal line and the common electrode 8 can be decreased, and power consumption of the COA array substrate is reduced.

In the manufacturing method provided by an example of the embodiment, forming the black matrix 11 on the base substrate 100 includes forming the black matrix 11 before or after the common electrode 8 is formed, so that the black matrix 11 is in contact with the common electrode 8, and the black matrix 11 is electrically connected with the common electrode 8.

For example, the manufacturing method provided by an example of the embodiment, further includes forming a signal line, and a projection of the common electrode on the base substrate covers a projection of the signal line on the base substrate. For example, the signal line includes at least one of a data line 4 or a gate line 1'.

A structure of the black matrix 11 can include stacking layers of a conductive sub-layer and a light absorbing sub-layer. The conductive sub-layer is in contact with the common electrode 8, so as to be electrically connected with the common electrode. The light absorbing sub-layer is configured to enhance a light absorbing property of the black matrix 11, reduce reflection of the black matrix, and make the black matrix 11 present black.

Figure 5B:
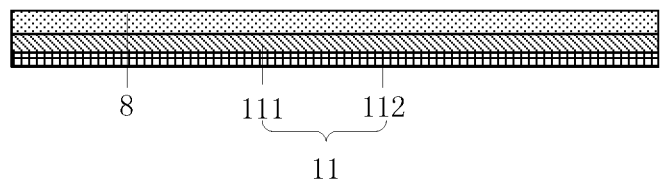

With respect to the black matrix 11 with the above-mentioned structure, in a case that the black matrix 11 is disposed below the common electrode 8, the light absorbing sub-layer can be formed first, and the conductive sub-layer is stacked on the light absorbing sub-layer to form the black matrix 11 as shown in Fig. 5 (b). Or, the conductive sub-layer of the black matrix 11 can also be formed first, the light absorbing sub-layer is stacked on the conductive sub-layer to form the black matrix 11, and the common electrode is formed on the light absorbing sub-layer. In a case that the black matrix 11 is disposed on the common electrode, the conductive sub-layer of the black matrix 11 can be formed first, and the light absorbing sub-layer of the black matrix 11 is stacked on the conductive sub-layer.

In a case that the conductive sub-layer of the black matrix 11 is formed by metal or metal alloy, the conductive sub-layer can be formed by a sputtering method with a target of metal or metal alloy.

In a case that the light absorbing layer of the black matrix 11 is made of a material of metal oxide or metal alloy oxide, the light absorbing layer can be deposited by a sputtering method with a target of metal or metal alloy in argon and oxygen atmosphere. For example, process parameters in the sputtering method can be: a temperature of the COA array substrate is 120° C., a power of the electrodes in a chamber is 24 kW, a pressure in the chamber is 0.3 Pa, a gas flow of argon is 100 sccm, a gas flow of oxygen is less or equal to 5 sccm. In a case that the light absorbing sub-layer of the black matrix 11 is made of metal nitride or metal alloy nitride, the light absorbing sub-layer can be deposited by a sputtering method with a target of metal or metal alloy in argon and nitrogen atmosphere. For example, process parameters in the sputtering method can be: a temperature of the COA array substrate is 120° C., a power of the electrodes in a chamber is 24 kW, a pressure in the chamber is 0.3 Pa, a gas flow of argon is 100 sccm, a gas flow of nitrogen is less or equal to 5 sccm. It should be noted that, manufacturing methods of the conductive sub-layer and the light absorbing layer are not limited thereto.

Fifth Embodiment

Figure 9:
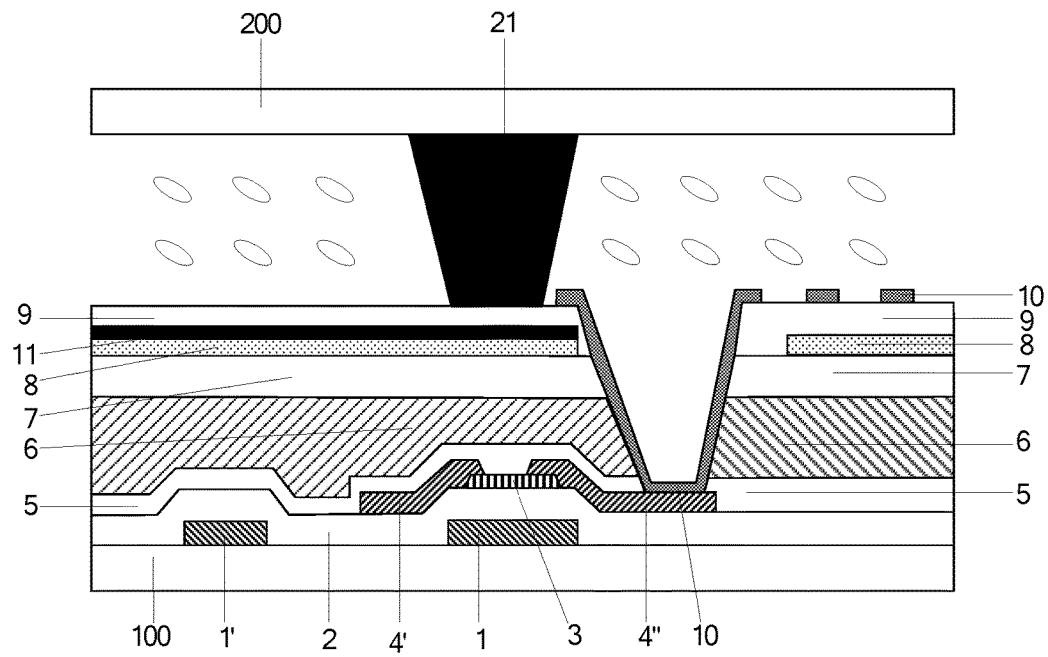
FIG. 9 is a sectional view of a display device provided by a fifth embodiment of the disclosure.
Figure 10:
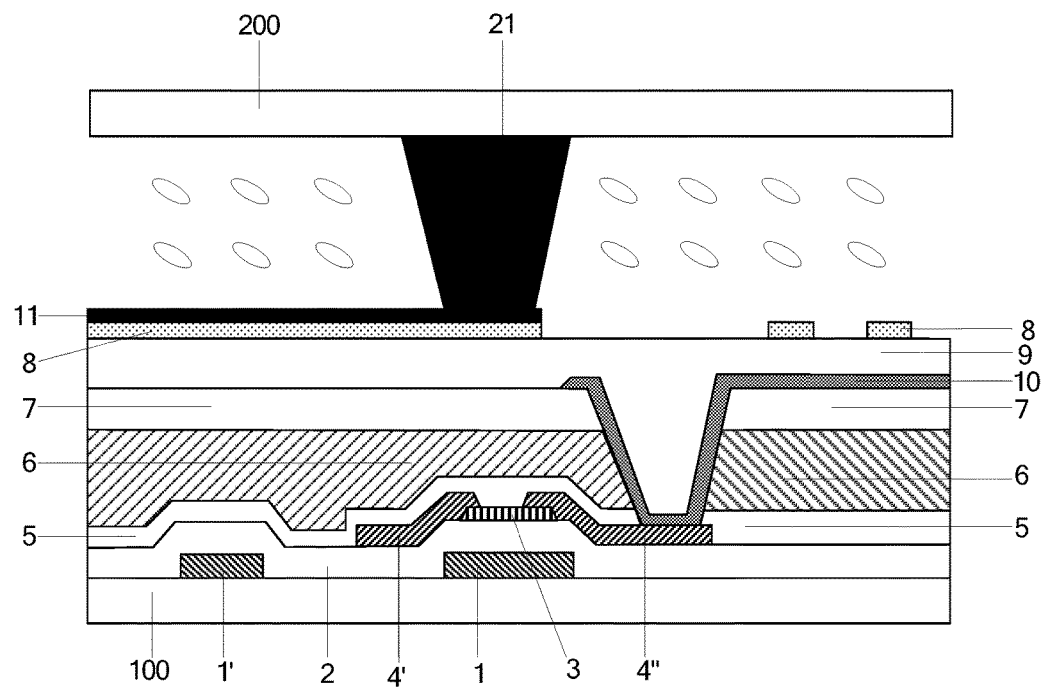
FIG. 10 is a sectional view of another display device provided by the fifth embodiment of the disclosure.
Figure 11:
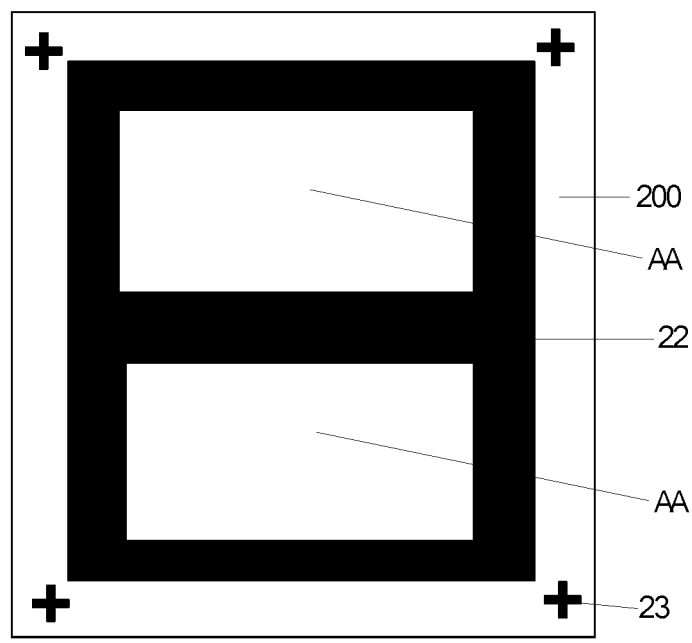
FIG. 11 is a plan view of an opposing substrate of a display device provided by the fifth embodiment of the disclosure.

A display device is provided by the embodiment, as illustrated in FIG. 9, FIG. 10, and FIG. 11. The display device includes any one of the COA array substrates provided by the above-mentioned embodiments of the disclosure. Because any one of the COA array substrates provided by the above-mentioned embodiments of the disclosure is provided with advantages of lower parasitic capacitance and lower power consumption, the display device including the COA array substrate is also provided with advantages of lower parasitic capacitance and lower power consumption.

It should be noted that, a structure of a display device with a pixel electrode 10 located on a common electrode 8 can refer to FIG. 9, and a structure of a display device with a common electrode 8 located on a pixel electrode 10 can refer to FIG. 10.

The display device provided by the embodiment can further include an opposing substrate opposite to the COA array substrate. The opposing substrate includes a transparent substrate 200, and a spacer 21, an alignment mark 23 and a light shielding frame 22 located on a surface of the transparent substrate 200 facing to the COA array substrate. The spacer 21 is configured to support the opposing substrate to retain a gap between the COA array substrate and the opposing substrate. The alignment mark 23 is configured to align the opposing substrate and a base station for assembling exactly, so that an alignment liquid can be coated on the transparent substrate 200, a film process is accurate, and the COA array substrate and the opposing substrate are cell-assembled exactly, and so on. A display area AA of the display device is surrounded by the light shielding frame 22. And the light shielding frame 22 acts as a frame of the display device.

In an conventional technology , the spacer is made of a transparent material, the alignment mark and the light shielding frame are formed with a black material, therefore, two patterning processes are needed to form the spacer, the alignment mark, and the light shielding frame, one patterning process is configured to form the alignment mark, and the light shielding frame, and the other patterning process is configured to form the spacer. The spacer 21, the alignment mark 23 and the light shielding frame 22 provided by the embodiment can be the same black material. Therefore, they can be formed by the same patterning process. Compared with the conventional technology, the number of patterning processes is reduced, a manufacturing process of the opposing substrate is simplified, and a manufacturing cost of the opposing substrate is decreased.

Moreover, because the spacer in a conventional technology is made of a transparent material, and a reflection rate of a transparent material is big, and much light is reflected in the liquid cell, and the display quality is influenced. The spacer 21 provided by the embodiment is made of a black organic insulation material, and the black organic insulation material is provided with a good light absorbing property, light reflected in a liquid cell is decreased, and the picture quality is improved, and the display quality is increased.

In the embodiment, the black organic insulation material configured to form the spacer 21, the alignment mark 23 and the light shielding frame 22 can include red resin, green resin, and blue resin. The black organic insulation material can be formed by mixing the resins including red resin, green resin, and blue resin respectively in proportions. Or, the black organic insulation material can include a black resin with a light absorbing property. Or, the black organic insulation material includes a resin and carbon black particles, and the carbon black particles are enclosed by the resin. The black organic insulation material can be formed by mixing a few carbon black particles (for example, carbon black particles account for less than 5% of the whole black organic insulation material) into a resin, and the resin covers a surface of the carbon black particles. Because an amount of the carbon black particles is small and the carbon black particles are enclosed by the resin, the black organic insulation material is provided with a good electrical insulation property.

In order to ensure that the black organic insulation material forming the spacer 21, the alignment mark 23 and the light shielding frame 22 has a good light shielding property and electrical insulation property, the black organic insulation material satisfies at least one of the following conditions: (1) A good light absorbing property, an optical density value is in a range of 1.0-2.0/μm. That is, the optical density value can be 1.0-2.0 per micron in thickness; (2) A lower dielectric coefficient, a dielectric coefficient of the black organic insulation material is less than 5; (3) A higher resistance, a sheet resistance is greater than $1.0 \times 10^{14} \Omega/\square$; (4) A good voltage maintenance ratio, a voltage maintenance ratio is greater than 85%.

It is to be noted that, the display device can include any products or components having display function such as liquid crystal panel, e-Paper, organic light-emitting diode display panel, mobile phone, watch, panel computer, TV set, display apparatus, laptop, digital photo frame, navigation instrument or the like.

The following tips are to be noted.

(1) The pattern of the black matrix is not limited to the pattern illustrated in the drawings.

(2) The accompanying drawings involve only the structure(s) in connection with the embodiment(s) of the present disclosure, and other structure(s) can be referred to common design(s). refer to usual designs based on the disclosure.

(3) In order to clearly illustrate, a layer or an area may be amplified in the drawings of the embodiments of the present invention. That is, the drawings are not drawn to scale. It is to be understood that, when a member such as a layer, a film, an area or a substrate is located or disposed on or below another member, the member can be located or disposed on or below the another member directly, or an intermediate member or intermediate member(s) can be disposed.

(4) The features in different embodiments or the features in the same embodiments can be combined without conflict.

What have been described above are only specific implementations of the present disclosure, the protection scope of the present invention is not limited thereto. Any modifications or substitutions easily occur to those skilled in the art within the technical scope of the present disclosure should be within the protection scope of the present invention. Therefore, the protection scope of the present invention should be based on the protection scope of the claims.

This application claims the benefit of priority from Chinese patent application No. 201510347724.8, filed on Jun. 19, 2015, the disclosure of which is incorporated herein in its entirety by reference as a part of the present application.

What is claimed is:

1. A display device comprising an array substrate, the array substrate comprising a base substrate, and a color filter layer, a common electrode and a black matrix disposed on the base substrate, wherein the black matrix is capable of conducting electricity, and the black matrix is electrically connected with the common electrode;

wherein the display device further comprises an opposing substrate opposite to the array substrate, and the opposing substrate comprises a transparent substrate and a spacer located on a surface of the transparent substrate facing to the array substrate, wherein the spacer is configured to support the opposing substrate to retain a gap between the array substrate and the opposing substrate, wherein the black matrix is closer to the base substrate than the common electrode, and the black matrix comprises a conductive sub-layer and a light absorbing sub-layer, wherein the light absorbing sub-layer is closer to the base substrate than the conductive sub-layer, and an electricity conducting property of the light absorbing sub-layer is less than that of the conductive sub-layer, and wherein a material of the conductive sub-layer comprises molybdenum, silver, aluminum-neodymium alloy or molybdenum-titanium alloy, and a material of the light absorbing sub-layer comprises molybdenum-tantalum alloy oxide, molybdenum-titanium alloy oxide, molybdenum-tantalum alloy nitride, or molybdenum-titanium alloy nitride.

2. The display device according to claim 1, wherein the black matrix is in contact with the common electrode.

3. The display device according to claim 2, wherein the conductive sub-layer is provided with a pattern of the black matrix.

4. The display device according to claim 3, wherein the conductive sub-layer is in contact with the common electrode.

5. The display device according to claim 3, wherein the light absorbing sub-layer is provided with the pattern of the black matrix.

6. The display device according to claim 1, further comprising a signal line disposed on the base substrate, wherein a projection of the common electrode on the base substrate covers a projection of the signal line on the base substrate.

7. The display device according to claim 6, wherein the signal line comprises at least one of a data line or a gate line.

8. The display device according to claim 1, further comprising a pixel electrode located on or below the common electrode, and an insulation dielectric layer located between the common electrode and the pixel electrode.

9. The display device according to claim 1, wherein the opposing substrate further comprises an alignment mark and a light shielding frame located on the surface of the transparent substrate facing to the array substrate; and a display area of the display device is surrounded by the light shielding frame; a material of the spacer, the alignment mark and the light shielding frame is a same black organic insulation material.

10. The display device according to claim 9, wherein the black organic insulation material comprises red resin, green resin and blue resin; or the black organic insulation material comprises a black resin with light absorbing property; or the black organic insulation material comprises a resin and carbon particles, and the carbon black particles are enclosed by the resin.

11. The display device according to claim 9, wherein a dielectric coefficient of the black organic insulation material is less than 5, a sheet resistance is greater than $1.0 \times 10^{14} \Omega/\square$, a voltage maintenance ratio is greater than 85%, or an optical density value is in a range of 1.0-2.0/μm.

12. A manufacturing method of a display device, comprising:
forming an array substrate comprising forming a color filter layer, a common electrode, and a black matrix on a base substrate, wherein the black matrix is capable of conducting electricity, and the black matrix is electrically connected with the common electrode;
assembling the array substrate with an opposing substrate, wherein the opposing substrate is opposite to the array substrate, and the opposing substrate comprises a transparent substrate and a spacer located on a surface of the transparent substrate facing to the array substrate, wherein the spacer is configured to support the opposing substrate to retain a gap between the array substrate and the opposing substrate,
wherein the black matrix is closer to the base substrate than the common electrode, and the black matrix comprises a conductive sub-layer and a light absorbing sub-layer,
wherein the light absorbing sub-layer is closer to the base substrate than the conductive sub-layer, and an electricity conducting property of the light absorbing sub-layer is less than that of the conductive sub-layer, and
wherein a material of the conductive sub-layer comprises molybdenum, silver, aluminum-neodymium alloy or molybdenum-titanium alloy, and a material of the light absorbing sub layer comprises molybdenum-tantalum alloy oxide, molybdenum-titanium alloy oxide, molybdenum-tantalum alloy nitride molybdenum-titanium alloy nitride.

13. The manufacturing method of the display device according to claim 12, further comprising forming a signal line, wherein a projection of the common electrode on the base substrate covers a projection of the signal line on the base substrate.

14. The manufacturing method of the display device according to claim 13, wherein the signal line comprises at least one of a data line or a gate line.

15. The manufacturing method of the display device according to claim 12, wherein the black matrix is in contact with the common electrode.

* * * * *